US009860267B2

(12) United States Patent
Rusakov et al.

(10) Patent No.: US 9,860,267 B2
(45) Date of Patent: *Jan. 2, 2018

(54) METHOD AND SYSTEM OF ELIMINATING VULNERABILITIES OF SMART DEVICES

(71) Applicant: AO Kaspersky Lab, Moscow (RU)

(72) Inventors: Vyacheslav E. Rusakov, Moscow (RU); Marta Anna Janus, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,145

(22) Filed: Aug. 11, 2016

(65) Prior Publication Data
US 2017/0272460 A1  Sep. 21, 2017

Related U.S. Application Data

(63) Continuation-in-part of application No. 15/148,153, filed on May 6, 2016.

(30) Foreign Application Priority Data

Mar. 18, 2016  (RU) .................................. 2016109930

(51) Int. Cl.
*H04L 29/06*  (2006.01)
*H04L 29/08*  (2006.01)
*H04L 12/24*  (2006.01)

(52) U.S. Cl.
CPC ...... *H04L 63/1433* (2013.01); *H04L 41/0809* (2013.01); *H04L 67/02* (2013.01); *H04L 67/06* (2013.01)

(58) Field of Classification Search
None
See application file for complete search history.

(56) References Cited

U.S. PATENT DOCUMENTS 7,073,198 B1 * 7/2006 Flowers ............. H04L 63/1433
                                                 713/151
9,094,407 B1    7/2015 Matthieu et al.
(Continued)

OTHER PUBLICATIONS

Niemietz et al., "Not So Smart on Smart TV Apps", 2015 International Workshop on Secure Internet of Things, IEEE, Sep. 21, 2015, pp. 72-81.

(Continued)

*Primary Examiner* — Amir Mehrmanesh
(74) *Attorney, Agent, or Firm* — Arent Fox LLP; Michael Fainberg

(57) ABSTRACT

Disclosed are systems and methods for eliminating vulnerabilities of smart devices connected to a data network. An example method includes: identifying a router providing access to the data network, obtaining access to the network and transmitting a request through the data network to obtain access to a smart device on the network. Furthermore, the method includes accessing the smart device to obtain its settings, comparing the settings with known vulnerabilities, determining an action for repairing the a network vulnerability associated with the settings of the device, and transmitting instructions to the smart device to perform the action to repair network vulnerability associated with the setting.

20 Claims, 7 Drawing Sheets

(56) References Cited

U.S. PATENT DOCUMENTS

| | | | |
|---|---|---|---|
| 9,191,289 B2 | 11/2015 | Zhang | |
| 9,356,939 B1* | 5/2016 | Gates | H04L 63/104 |
| 2002/0124094 A1* | 9/2002 | Chang | H04L 12/2602 |
| | | | 709/230 |
| 2003/0126472 A1* | 7/2003 | Banzhof | G06F 21/577 |
| | | | 726/25 |
| 2006/0106917 A1* | 5/2006 | Lambourn | G06F 21/6218 |
| | | | 709/217 |
| 2011/0087899 A1* | 4/2011 | Fetik | G06F 21/552 |
| | | | 713/193 |
| 2013/0312097 A1* | 11/2013 | Turnbull | G06F 21/55 |
| | | | 726/24 |
| 2014/0007048 A1* | 1/2014 | Qureshi | G06F 21/10 |
| | | | 717/110 |
| 2014/0007222 A1* | 1/2014 | Qureshi | G06F 21/10 |
| | | | 726/16 |
| 2015/0033350 A1 | 1/2015 | Oliphant | |

OTHER PUBLICATIONS

Min Byungho et al. Design and Evaluation of Feature Distributed Malware Attacks against the Internet of Things (IOT) 2015 20th international Conference on Engineering on Complex Computer Systems, IEEE. Dec. 9, 2015. pp. 80-89.

* cited by examiner

METHOD AND SYSTEM OF ELIMINATING VULNERABILITIES OF SMART DEVICES

CROSS-REFERENCE TO RELATED APPLICATIONS

This application is a continuation-in-part of U.S. application Ser. No. 15/148,153 filed on May 6, 2016, which claims benefit of priority under 35 U.S.C. 119(a)-(d) to a Russian Patent Application No. RU 2016109930 filed on Mar. 18, 2016, both of which are incorporated by reference.

FIELD OF TECHNOLOGY

The present disclosure relates generally to the field of computer security and antivirus technologies, and more specifically, to a system and method of eliminating vulnerabilities of smart devices having Internet access.

BACKGROUND

At present, an ever increasing number of devices are connected to the Internet from computers and smartphones of users to more commonplace things, such as television sets and refrigerators. When new types of devices are connected to the Internet, they take on the adjective "Smart" (such as a Smart TV), which serves for marketing purposes. When smart devices are connected to the Internet, the users become able to update the devices as such, monitor the operating status of the device (such as a refrigerator), and integrate the device itself into a so-called "smart home" concept. This concept makes it possible to control such smart devices from a single point by checking the operating status of such devices and adjusting it to one's own personal needs. The concept of a "smart home" also involves another concept known as the Internet of Things (IoT), which implies an interaction of the aforementioned things even without direct human involvement.

One of the first devices to appear among users was the router, which made it possible to create a wireless home network, today making it possible to connect other smart devices to the Internet. At present, many routers support the possibility of creating so-called heterogeneous networks. As an example, one can mention a network of smart devices, some of which are connected to a router via a wireless Wi-Fi network, and others through Bluetooth.

Not surprisingly, with the growth in the number of devices having a network interaction capability, there has also begun to grow the number of attempts to use such devices maliciously. Upon obtaining access to a router with administrator rights, it becomes possible to check the network traffic going through the router. Upon gaining access to such devices as a "smart watch", it becomes possible to check the data on devices paired with this watch (e.g., by smartphone). All of these actions can lead to theft or substitution of data.

An analysis of the conventional security systems indicates many are ineffective and, in some cases, not possible to use the previous technologies, whose drawbacks are solved by the present disclosure that eliminates the vulnerabilities of devices having Internet access.

SUMMARY

Disclosed are systems and methods for eliminating vulnerabilities of smart devices connected to a data network. According to an exemplary aspect, the method includes identifying, by a processor, a router configured to provide access to the data network; obtaining access to the network by the processor; transmitting, by the processor, a request through the data network to obtain access to at least one smart device communicatively coupled to the router; accessing the at least one smart device to obtain settings of the at least one smart device; comparing, in a database, each of the settings of the at least one smart device with settings of known vulnerabilities to identify at least one network vulnerability associated with at least one of the settings of the at least one smart device; determining, by the processor, an action for repairing the at least one network vulnerability associated with the at least one setting of the at least one smart device; and transmitting instructions to the at least one smart device to perform the action for repairing the at least one network vulnerability associated with the at least one setting of the at least one smart device.

According to another aspect, the method further includes accessing, by the processor, a web interface of the at least one smart device by obtaining a web page and parsing elements of the web page based on a document object model; and using the web interface of the at least one smart device to obtain the settings of the at least one smart device.

According to another aspect, the method further includes transmitting instructions to the at least one smart device to repairing the at least one network vulnerability by adjusting the settings of a file of the at least one smart device by changing the file.

According to another aspect, the method further includes transmitting instructions to the at least one smart device to repair the at least one network vulnerability by adjusting through the web interface of the at least one smart device.

According to another aspect, the accessing, by the processor, of the at least one smart device comprises at least one of obtaining web access to the at least one smart device, accessing the at least one smart device through a universal plug and play protocol, accessing the at least one smart device through a file transfer by a network address of the at least one smart device in the data network; accessing the at least one smart device through a remote administration protocol, and accessing the at least one smart device by a secure shell protocol.

According to another aspect, the transmitting of the request through the data network comprises transmitting the request to the router that redirects the request to a plurality of smart devices communicatively coupled to the data network via the router.

According to another aspect, the accessing of the at least one smart device to obtain the settings of the at least one smart device includes using a UPnP (Universal Plug-and-Play) protocol to obtain the settings.

According to one aspect, a system for eliminating vulnerabilities of smart devices connected to a data network comprises: at least one database that stores settings of devices relating to network vulnerabilities and actions for repairing the network vulnerabilities; and a processor configured to: identify a router configured to provide access to the data network, obtain access to the network, transmit a request through the data network to obtain access to at least one smart device communicatively coupled to the router, access the at least one smart device to obtain settings of the at least one smart device, compare, in the least one database, each of the settings of the at least one smart device with the settings of devices of known vulnerabilities to identify at least one network vulnerability associated with at least one of the settings of the at least one smart device, determine an action for repairing the at least one network vulnerability associated with the at least one setting of the at least one smart device, and transmit instructions to the at least one smart device to perform the action for repairing the at least one network vulnerability associated with the at least one setting of the at least one smart device.

According to another aspect, a non-transitory computer readable medium storing computer executable instructions for eliminating vulnerabilities of smart devices connected to a data network, includes instructions for: identifying a router configured to provide access to the data network; obtaining access to the network; transmitting a request through the data network to obtain access to at least one smart device communicatively coupled to the router; accessing the at least one smart device to obtain settings of the at least one smart device; comparing, in a database, each of the settings of the at least one smart device with settings of known vulnerabilities to identify at least one network vulnerability associated with at least one of the settings of the at least one smart device; determining an action for repairing the at least one network vulnerability associated with the at least one setting of the at least one smart device; and transmitting instructions to the at least one smart device to perform the action for repairing the at least one network vulnerability associated with the at least one setting of the at least one smart device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for eliminating vulnerabilities of smart devices having Internet access. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

For purposes of this disclosure, the term "smart device" is used to describe to devices, such as everyday items including, for example, watches, lights, cameras, Dictaphones, wristbands, heart rate monitors, and others having access to the Internet (or a local area network) through various kinds of connections, such as Wi-Fi or Bluetooth. Such devices create network connections, receive and process incoming traffic, and have a separate interface for the interaction (an API, or Application Programmable Interface), which makes it possible not only to monitor the parameters of the device, but also set them.

Figure 1:
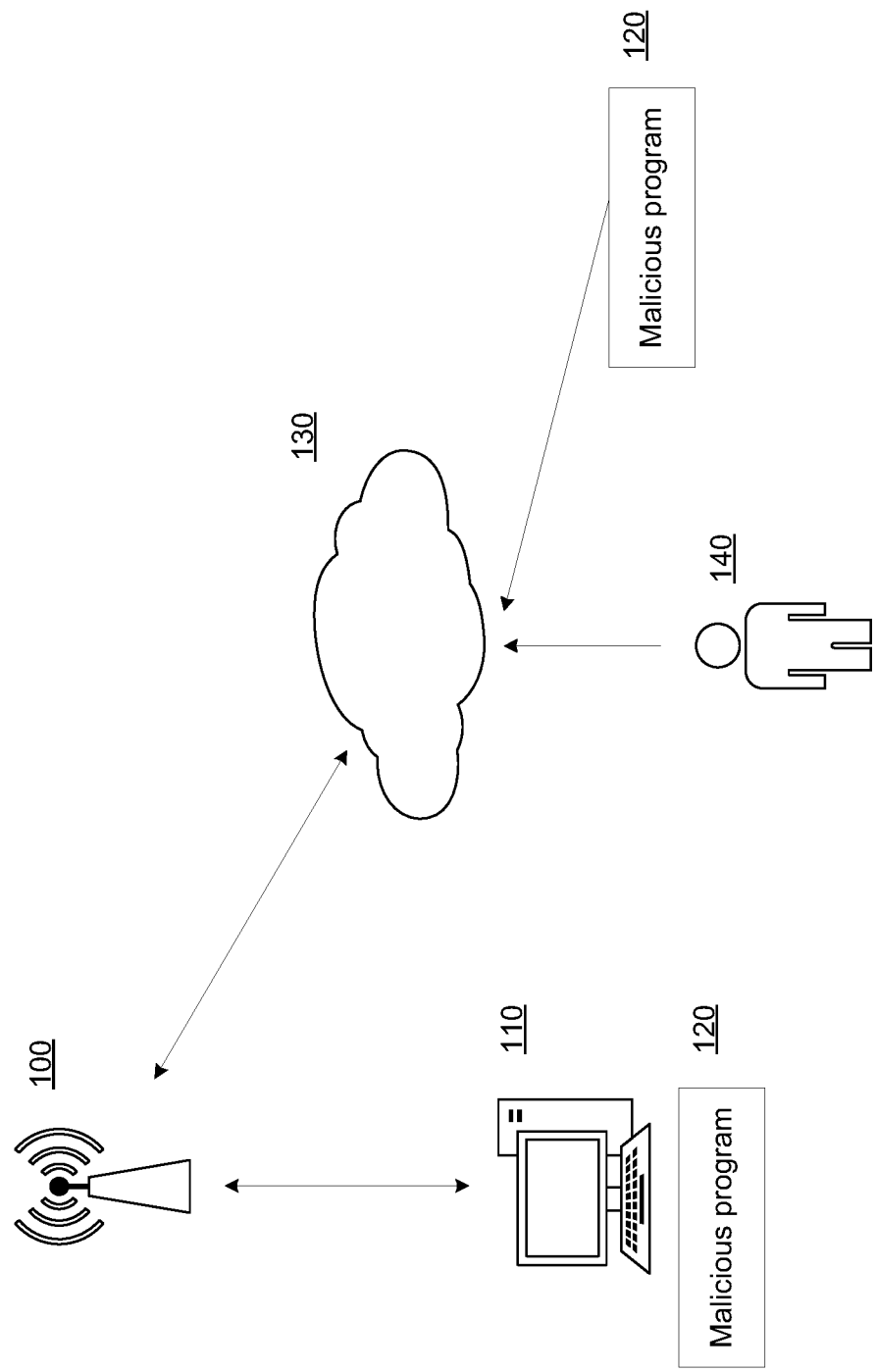
FIG. 1 illustrates an example of a computer attack on a router.

FIG. 1 illustrates an example of a computer attack on a router. A router 100 is hooked up to both a computer 110 (for example, via Ethernet or Wi-Fi) and to the Internet 130. The router has the following access options:

Web access. As a rule, this is the page http://192.168.0.1, where after entering the login and password of the administrator the user obtains access to the settings of the router.

Access to the settings/variables file. Routers have their own file system and store the settings in configuration files, making it possible to change them if a user knows how to gain access to such a file.

Access using various utilities. For example, the utility fdbrowser, which is part of the Microsoft SDK, lets one use the protocol UPnP (Universal Plug-and-Play) to obtain access to the router settings and change them.

Not surprisingly, with such an array of access options to such an important element of the local area network as a router interests hackers. For example, many users do not change the default password of the administrator, so web access to the router is vulnerable. Hackers have many option for the use of a router for their own purposes:

Interception of traffic. For example, interception of transactions, carrying out MitM (Man in the Middle) attacks.

Installing of backdoors for later control of the router and its configuration. The router can be used as a proxy server or be involved in a DDoS attack.

DNS hijacking.

One can realize such actions using a malicious program 120 on the computer 110 or on the Internet 130, or using a computer attack from a hacker 140. As a rule, such attacks involve searching for the router 100 itself, determining its version and known vulnerabilities for the given version, and carrying out the attack using an exploit.

Figure 2:
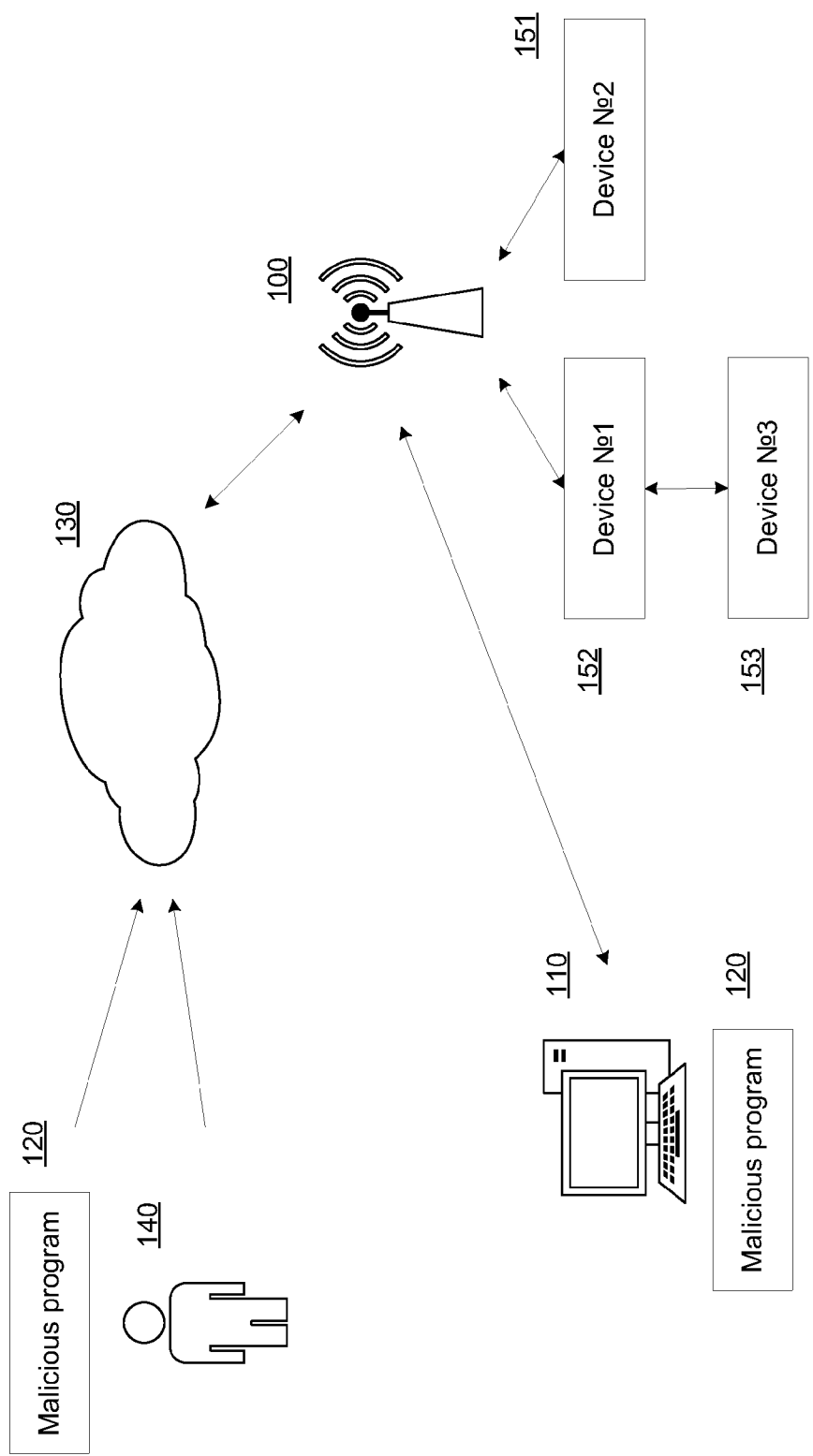
FIG. 2 shows an example of a computer attack on smart devices.

FIG. 2 shows an example of a computer attack on smart devices. In FIG. 2 as compared to FIG. 1, smart devices are illustrated in the form of devices 151-153. The attack vectors remain the same whether the malicious program 120 on the computer 110 or via the Internet 130, or using a computer attack from the hacker 140 are used. These attacks involve searching for one of the devices 151-153, determining its version and known vulnerabilities for the given version, and carrying out the attack using an exploit.

As described herein, the smart devices can be connected not directly to the router 100, but through another device—such as a smart watch via a smartphone. An example of such a connection might be the pairing of the smart watch Samsung Gear with the smartphone Samsung Galaxy. An API interface such as the Wearable Message API can be used for the link between the devices.

It should be appreciated that possible problems which may arise in the event that the hacker has successfully carried out the computer attack on the smart device. Here is a non-exhaustive list of such problems according to the conclusion of the Internet publication "The Wired" of December 2015:

Obtaining control over a number of sub-assemblies of the Jeep Cherokee automobile, even including control of the speed;

Control of certain medical devices in clinics, such as those which automatically administer medicine to patients;

Even toys such as the latest versions of the Barbie doll with Wi-Fi support are vulnerable to computer attacks.

To be sure, the manufacturers of smart devices are trying to eliminate known vulnerabilities, but in a number of cases security is not a priority in the development of such devices. A solution is needed which can close up the vulnerabilities on routers and smart devices by means of their settings.

Figure 3:
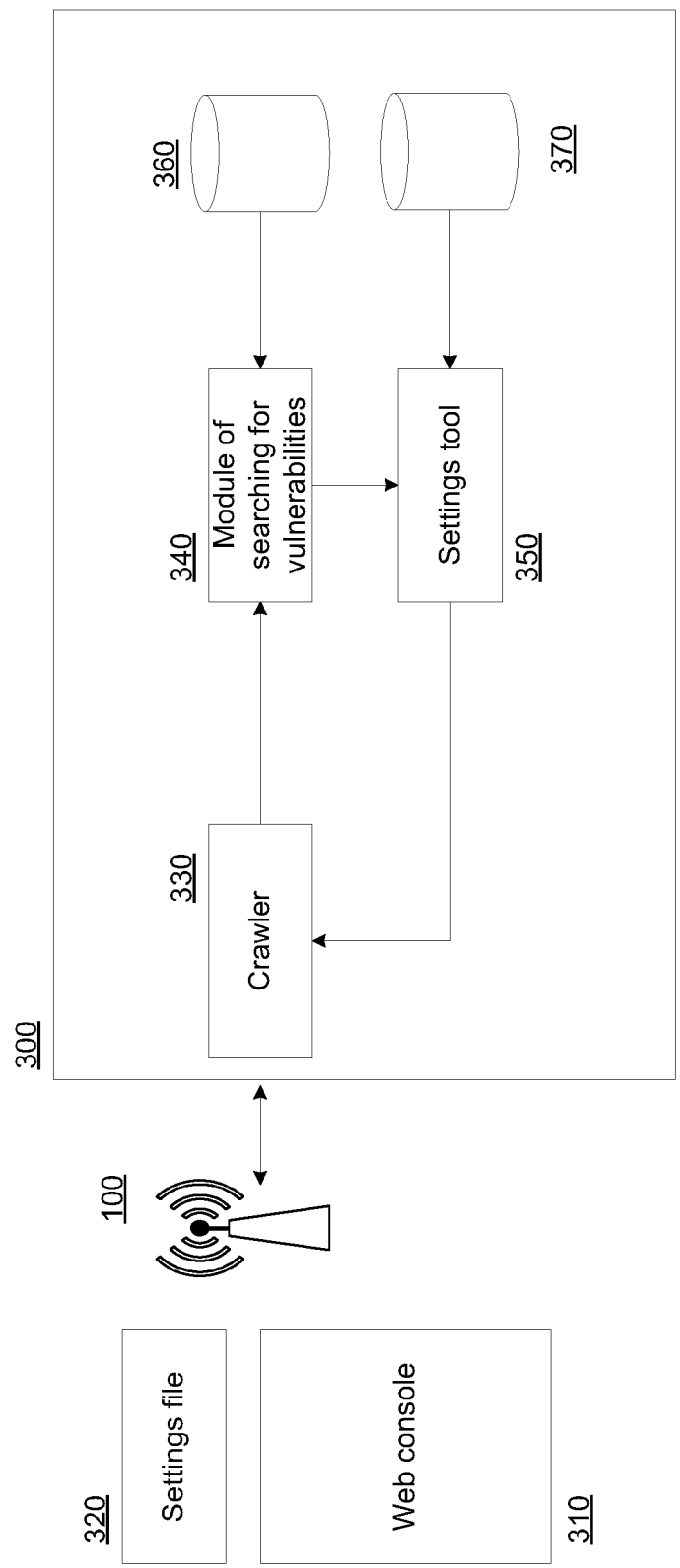
FIG. 3 shows a block diagram of the system for eliminating vulnerabilities of devices having access to the Internet according to an exemplary aspect.

FIG. 3 shows a block diagram of the system according to an exemplary aspect. The system 300 for detecting and correcting of vulnerabilities of a router 100 includes the following modules: a crawler 330, a module of searching for vulnerabilities 340, a database of vulnerabilities 360, a settings tool 350 and a settings database 370.

According to the exemplary aspect of the system for detecting and correcting of vulnerabilities includes the aforementioned module installed in the form of applications on a computer which is connected to the router 100.

The crawler or search robot 330 is designed to sort through accessible objects in the network (such as computers, the router, smartphones and other devices connected to the network) using known network protocols (such as UDP). In the context of the description of FIG. 3, it is assumed that the object in the network is a router 100. The typical operation of the crawler 330 includes: sending a broadcast request through the network, obtaining a response from all accessible objects in the network and further analysis of them. Examples of a crawler include search robots of Google or Yandex.

The analysis of the object in the network by the crawler 330 includes the follow algorithm. Specifically, after the crawler 330 has obtained the list of all accessible objects in the network after the broadcast request, it tries to obtain access to an object by one method or another. According to the exemplary aspects, the following are examples of such access:

Web access. As a rule, if the object returns its address, such as 192.168.0.1, this may mean that the object is a router and one can gain access to it through the HTTP protocol.

Access through the UPnP protocol.

Access through the FTP protocol by the network address of the object in the network.

Access through the remote administration protocol (RDP).

Access by the SSH protocol.

The access to the object in a network may require authorization. The authorization may be performed both manually and automatically, when the crawler perform authorization using popular login/password groups (such as admin/admin, admin/1q2w3e, guest/guest and others) or through online automatic authentication techniques (such as Active Directory).

For example, in the case of access via UPnP, one may obtain the following data fields characterizing the router 100:

PKEY_PNPX_DeviceCategory
PKEY_PNPX_Types
PKEY_DeviceDisplay_FriendlyName
PKEY_DeviceDisplay_Manufacturer
PKEY_DeviceDisplay_ModelName
PKEY_DeviceDisplay_ModelNumber
PKEY_PNPX_PresentationUrl
PKEY_PNPX_IpAddress
PKEY_PNPX_XAddrs
PKEY_Device_LocationInfo The following provides an example of how the crawler 330 gains access to the web interface of the router 100. The crawler 330 obtains the start web page (generally accessible at the address http://192.168.0.1) and begins to parse its elements according to the DOM model. DOM (Document Object Model) is an object model used for XML/HTML documents. Put simply, the DOM model is a representation of a document in the form of a tree of tags. This tree is formed by an embedded structure of tags plus text fragments of the page, each of which forms a separate node.

Figure 6:
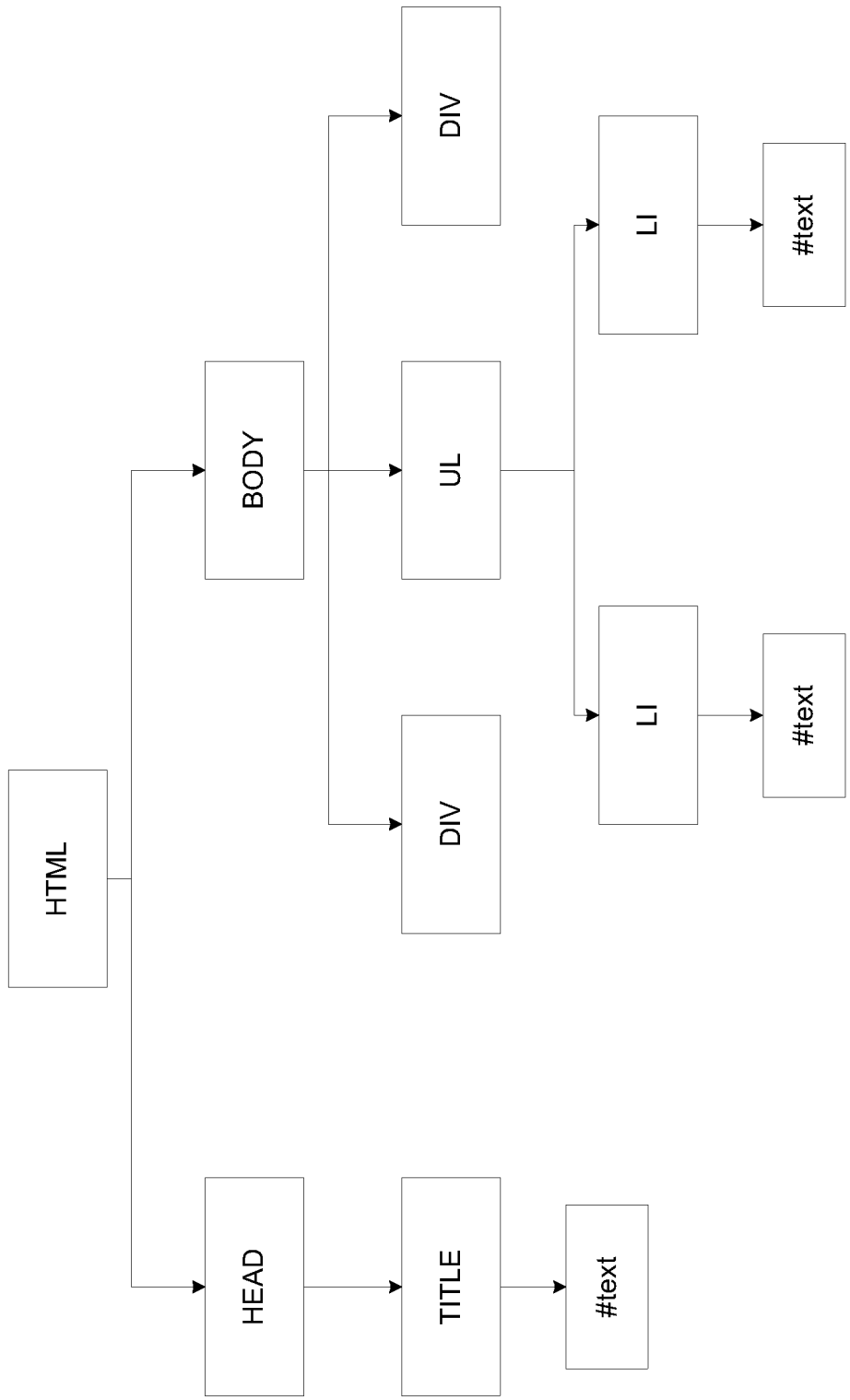
FIG. 6 shows an example of a DOM model for a HTML page.

FIG. 6 presents an example of the DOM model for an HTML page. The root node is the tag HTML, from which come the tags HEAD and BODY, which also have embedded tag nodes. By moving through the tree of the DOM model, one can find all necessary tags and determine their parameters (such as text for the tag TITLE).

The task of the crawler 330 is to search for all necessary tags in the DOM model of the web page obtained from the router 100. Examples of the necessary tags are: "A", "FORM", "INPUT" and other tags which may contain the necessary information. For example, an important tag in the structure of the DOM model of the web page obtained from the router 100 will be a tag of the kind <a href= " . . . ">Administration</a>, which is a link to the page with the router settings and its access rights.

Following the link found in the body of the tag <a>, the crawler 330 arrives at another page, where once more a search is made for all necessary tags in the DOM model of the given web page. The moving through all pages by following all links can be done recursively, or it can be done only by following necessary links whose titles indicate the important settings. The titles of such links are: "Setup", "Wireless", "Administration", "Access Restrictions", "Management", "Network", "Security" and others.

Having gained access to an object in the network, the crawler 330 obtains a list of available resources in the router 100. By resource, a parameter and/or attribute of the router which may be accessed and/or adjusted is meant. For example, in the case of access by FTP, this will be a set of paths to the file. In the case of access by the HTTP protocol, this may be a web page (or several web pages). The crawler 330 also determines open ports (such as 8080). The crawler 330 sends the obtained list of available resources to the module of searching for vulnerabilities 340.

The module of searching for vulnerabilities 340 obtains the list of available resources and, using the database of vulnerabilities 360, tries to determine the vulnerabilities associated with the given resources. The following are present examples of the rules for determining vulnerabilities which are kept in the aforementioned database.

Rule 1.
Accessible resource (type of resource): network port.
Status of resource (port): 8080, open.

Rule 2.
Accessible resource (type of resource): remote administration.
Status of resource: accessible.
Rule 3.
Accessible resource (type of resource): access by SSH.
Status of resource: access allowed with administrator rights.

The following list provides examples of the main types of resources according to one exemplary aspect:
Passwords,
Remote administration,
DNS settings,
Network ports,
Wi-Fi settings,
Access by various protocols (SSH, Telnet, FTP, HTTP (S)),
Firewall,
Services such as IPTV and others.

The module of searching for vulnerabilities 340 compares each resource from the list of available resources with the rules from the database of vulnerabilities 360 for a match between the type of resource and its status. If a match is found, the module of searching for vulnerabilities 340 determines the resource found with a similar vulnerable status and sends the information on the vulnerable resources found and their status to the settings tool 350.

The settings tool 350 uses the database of settings 370 to eliminate/repair the vulnerabilities in the vulnerable resources obtained from the module of searching for vulnerabilities 340.

The database of settings 370 contains rules which are analogous to those kept in the database of vulnerabilities 360. The following are examples of such rules.
Rule A.
Accessible resource (type of resource): remote administration.
Status of resource: accessible.
Solution: remove possibility of remote administration via web interface or another settings option of the router 100.
Rule B.
Accessible resource (type of resource): access by SSH.
Status of resource: access allowed with administrator rights.
Solution: close access by SSH via web interface or another settings option of the router 100.
Rule C.
Accessible resource (type of resource): administrator password.
Status of resource: not resistant to brute force.
Solution: choose a stronger password (automatically generate a new password).

For the specific example it is evident that Rule 2 from the database of vulnerabilities 360 matches up with Rule "A" from the database of settings 370, and Rule 3 with Rule "B" accordingly. The further adjustment consists in performing the actions indicated in the solution. The actions may be performed using the crawler 330.

The solution will look like one of the options:
Adjustment of the settings file of the router 100 by making changes in the file itself (for example, the SSH access line may look like "SSH connection=true", and its replacement consists in changing this line to "SSH connection=false").
Adjustment through the web interface of the router 100. This adjustment looks exactly the same as the circuit of the crawler 330 through the elements of the web pages, except in this case one searches for controlling elements such as <option>, <button>, <input> and others.

For example, in the case of abolishing the possibility of SSH access, there will be a search for the following elements (given as an example):

```
<select     name     =     "ssh_connect">
    <option value="true">Enabled</option>
    <option value="false">Disabled</option>
</select>
```

After which the element with value "false" will be selected.

Yet another example of adjustment of the router 100 consists in updating its firmware. In this case, the database of settings 370 contains, as solutions, versions of the firmware for the router 100 and the application of the solution consists in writing the firmware file to the router 100 using the crawler 330 and its subsequent execution (as an example, using the web interface of the router 100).

Figure 4:
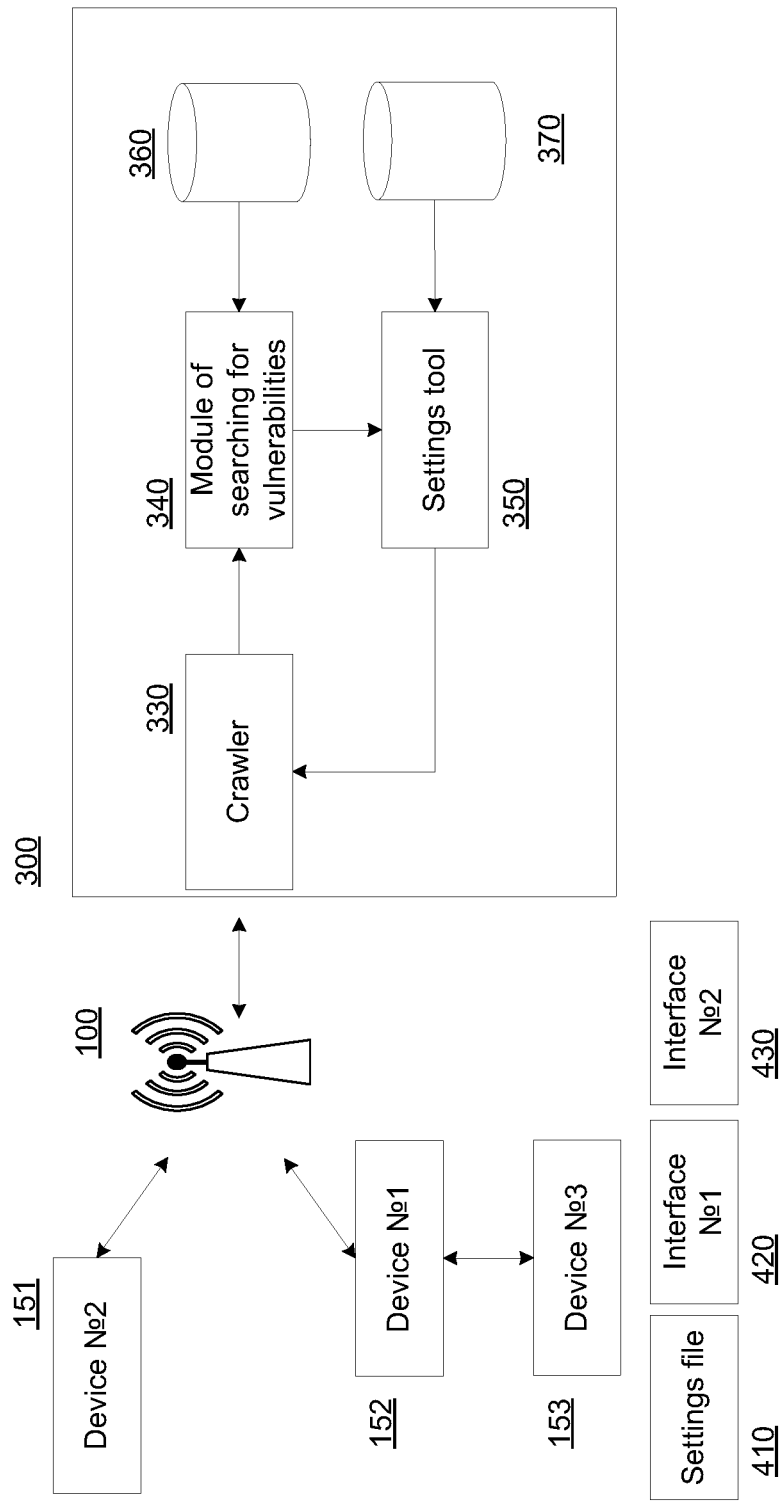
FIG. 4 shows a block diagram of the system with smart devices for eliminating vulnerabilities of devices having access to the Internet according to an exemplary aspect.

FIG. 4 shows a block diagram of the system with smart devices according to an exemplary aspect. As an illustration, FIG. 4 differs little from FIG. 3 with the exception of the adding of the devices 151-153—smart devices. The smart devices can be the same things such as watches, lights, cameras, Dictaphones, wristbands, heart rate monitors and others which have access to the Internet (or a local area network) through various kinds of connections, such as Wi-Fi or Bluetooth. In the present case, they are connected to the router 100. While the device 151 is connected directly to the Wi-Fi network of the router 100, the device 153 is connected through the device 152. An example of such a connection may be the pairing of the smart watch Samsung Gear (device 153) to the smartphone Samsung Galaxy (device 152). The pairing can be done using a separate application, the installed Samsung Galaxy (device 152).

The crawler 330 is designed to sort through the available objects in the network (such as the devices 151-153) using known protocols (such as UDP). In the context of the description of FIG. 4, it is assumed that the object in the network is one of the devices 151-153. The general operation of the crawler 330 involves: sending a broadcast request through the network, obtaining a reply from all available objects in the network, and further analysis of them. For the sending of the broadcast request, the crawler 330 should be registered in the network provided by the router 100. Thus, the first step is to detect the router 100 (as a device allowing access to the wireless Wi-Fi network) and to connect to this network, and only then send the broadcast request.

The analysis of the object in the network using the crawler 330 looks as follows. After the crawler 330 has obtained the list of all available objects in the network after the broadcast request, it tries to gain access to the object by one method or another. According to the exemplary aspect, the following are examples of such access:
Web access.
Access through the UPnP protocol.
Access through the FTP protocol by the network address of the object in the network.
Access through the remote administration protocol (RDP).

The access to the object in a network may require authorization. The authorization can be performed both manually and automatically, when the crawler sorts through popular login/password groups (such as admin/admin, admin/

1q2w3e, guest/guest and others) or through online automatic authentication techniques (such as Active Directory).

Having gained access to an object in the network, the crawler 330 obtains a list of available resources in one of the devices 151-153. For example, in the case of access by FTP, this will be a set of file paths. In the case of access by the HTTP protocol, this may be a web page (or several web pages). The crawler 330 also determines open ports (such as 8080). The crawler 330 sends the obtained list of available resources to the module of searching for vulnerabilities 340.

The module of searching for vulnerabilities 340 obtains the list of available resources and uses the database of vulnerabilities 360 to try and determine the vulnerabilities connected with the given resources. The module of searching for vulnerabilities 340 takes each resource from the list of available resources and compares it with rules from the database of vulnerabilities 360 for a match between the type of resource and its status. If a match is found, the module of searching for vulnerabilities 340 will define the resource found with a similar "vulnerable" status and send the information on the vulnerable resources found and their status to the settings tool 350.

The settings tool 350 uses the database of settings 370 to repair the vulnerabilities in the vulnerable resources obtained from the module of searching for vulnerabilities 340. The database of settings 370 contains rules which are analogous to those kept in the database of vulnerabilities 360. A further adjustment consists in performing the actions indicated in the solution. The actions can be performed by the crawler 330.

Figure 5:
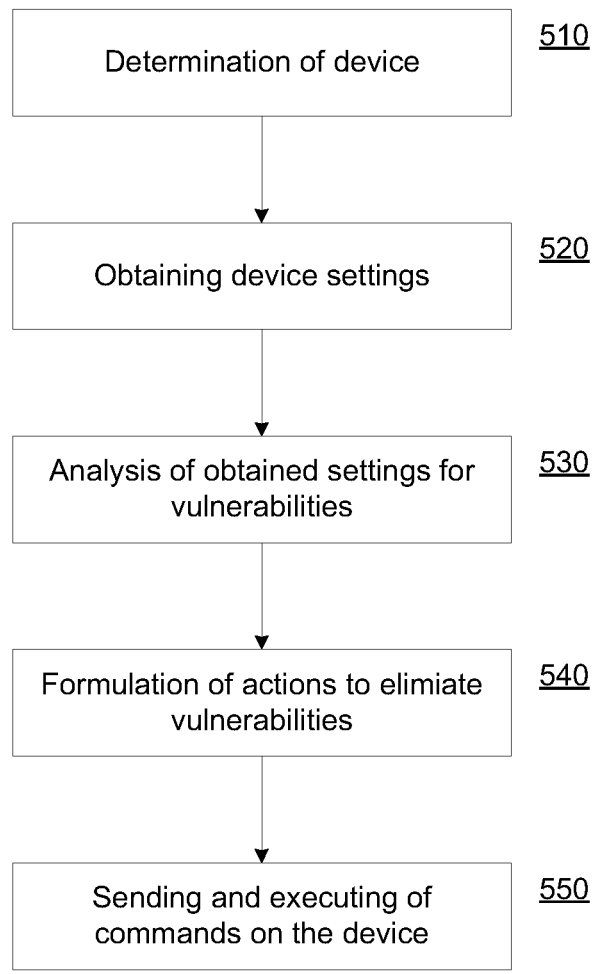
FIG. 5 shows a flowchart for a method for eliminating vulnerabilities of devices having access to the Internet according to the exemplary aspect.

FIG. 5 shows a flowchart for a method according to the exemplary aspect. As shown, in step 510 there is a determination of a device which can be accessed (for example, by the crawler 330, as described in detail for FIGS. 3 and 4). As was already described above, access can be obtained both to the router 100 and to the devices 151-153. In the latter case, first of all there is a request for access to the network where the indicated devices are accessible. In step 520 there is a determination of the settings of the device (of both router 100 and devices 151-153), which can also be done by the crawler 330. In step 530 an analysis is made of the obtained settings for vulnerabilities by the module of searching for vulnerabilities 340, after which in step 540 the settings tool 350 formulates a list of actions to eliminate the vulnerabilities found. In step 550 the crawler 330 performs the actions from the formulated list on the device.

Figure 7:
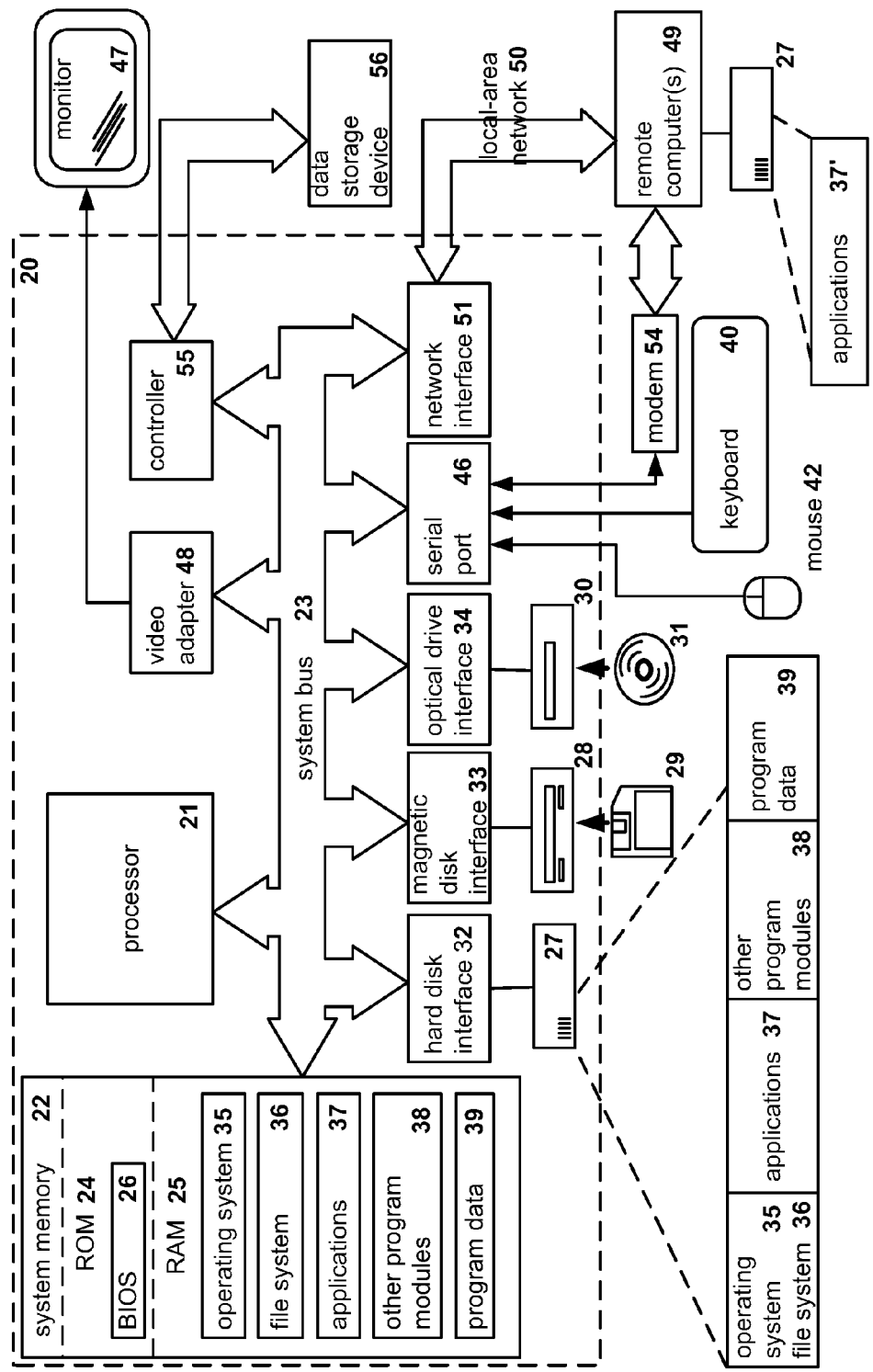
FIG. 7 illustrates an example of a general-purpose computer system on which the disclosed systems and method can be implemented.

FIG. 7 illustrates an example of a general-purpose computer system (which may be a personal computer or a server) on which the disclosed systems and method can be implemented according to an example aspect. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, by a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 7. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for eliminating vulnerabilities of smart devices connected to a data network, the method comprising:
identifying, by a processor, a router configured to provide access to the data network;
obtaining access to the network by connecting to the router;
transmitting, by the processor, a broadcast request through the data network to obtain access to at least one smart device communicatively coupled to the router;
accessing the at least one smart device communicatively coupled to the router;
obtaining settings of the at least one smart device by accessing a configuration file stored on the at least one smart device and containing settings of the smart device, wherein the settings of the at least one smart device includes one or both of a parameter or an attribute of the at least one smart device;
comparing, in a database, each of the settings of the at least one smart device with settings of known vulnerabilities to identify at least one network vulnerability of the at least one smart device that can be exploited by the processor by identifying a setting with a similar vulnerable status in the database;
determining, by the processor, an action for repairing the at least one network vulnerability associated with the at least one setting of the at least one smart device based on comparing of the each of the settings with the settings of known vulnerabilities in the database to identify the setting with the similar vulnerable status in the database; and
transmitting instructions to the at least one smart device to perform the action for repairing the at least one network vulnerability associated with the at least one setting of the at least one smart device, wherein the action comprises adjusting the setting of the smart device by making changes in the configuration file itself.

2. The method of claim 1, further comprising:
accessing, by the processor, a web interface of the at least one smart device by obtaining a web page and parsing HyperText Markup Language (HTML) elements of the web page based on a document object model, wherein the web page contains the settings of the smart device; and
using the web interface of the at least one smart device to obtain the settings of the at least one smart device.

3. The method of claim 1, wherein transmitting instructions to the at least one smart device for repairing the at least one network vulnerability further comprises:
changing a Boolean value in a line of the configurations file corresponding to the at least one network vulnerability associated with the at least one setting of the at least one smart device.

4. The method of claim 2, further comprising transmitting instructions to the at least one smart device for repairing the at least one network vulnerability by adjusting the setting through the web interface of the at least one smart device, comprising:
modifying the web page using the document object model to select an HTML control element corresponding to at least one setting of the smart device.

5. The method of claim 1, further comprising:
accessing a second smart device communicatively coupled to the router, wherein the accessing, by the processor, of the second smart device comprises at least one of obtaining web access to the second smart device, accessing the second smart device through a universal plug and play protocol, accessing the second smart device through a file transfer by a network address of the second smart device in the data network; accessing the second smart device through a remote administration protocol, and accessing the second smart device by a secure shell protocol.

6. The method of claim 1, wherein the transmitting of the broadcast request through the data network comprises transmitting the request to the router that redirects the request to a plurality of smart devices communicatively coupled to the data network via the router.

7. The method of claim 1, wherein the accessing of the at least one smart device to obtain the settings of the at least one smart device includes using a UPnP (Universal Plug-and-Play) protocol to obtain the settings.

8. A system for eliminating vulnerabilities of smart devices connected to a data network, the system comprising:
at least one database that stores settings of devices relating to network vulnerabilities and actions for repairing the network vulnerabilities; and
a hardware processor configured to:
identify a router configured to provide access to the data network,
obtain access to the network by connecting to the router,
transmit a broadcast request through the data network to obtain access to at least one smart device communicatively coupled to the router,
access the at least one smart device communicatively coupled to the router;
obtain settings of the at least one smart device by accessing a configuration file stored on the at least one smart device and containing settings of the smart device, wherein the settings of the at least one smart device includes one or both of a parameter or an attribute of the at least one smart device,
compare, in the least one database, each of the settings of the at least one smart device with the settings of devices of known vulnerabilities to identify at least one network vulnerability of the at least one smart device that can be exploited by the processor by identifying a setting with a similar vulnerable status in the database,
determine an action for repairing the at least one network vulnerability associated with the at least one setting of the at least one smart device based on the comparison of the each of the settings with the settings of known vulnerabilities in the database to identify the setting with the similar vulnerable status in the database, and
transmit instructions to the at least one smart device to perform the action for repairing the at least one network vulnerability associated with the at least one setting of the at least one smart device, wherein the action comprises adjusting the setting of the smart device by making changes in the configuration file itself.

9. The system of claim 8, wherein the at least one device is the router, the processor is further configured to:
access a web interface of the at least one smart device by obtaining a web page and parsing HyperText Markup Language (HTML) elements of the web page based on a document object model, wherein the web page contains the settings of the smart device; and
use the web interface of the at least one smart device to obtain the settings of the at least one smart device.

10. The system of claim 8, wherein the processor configured to transmit instructions to the at least one smart device for repairing the at least one network vulnerability is further configured to:
changing a Boolean value in a line of the configurations file corresponding to the at least one network vulnerability associated with the at least one setting of the at least one smart device.

11. The system of claim 9, wherein the processor is further configured to transmit instructions to the at least one smart device for repairing the at least one network vulnerability by adjusting the setting through the web interface of the at least one smart device, wherein the processor is further configured to:
modify the web page using the document object model to select an HTML control element corresponding to at least one setting of the smart device.

12. The system of claim 8, wherein the processor is further configured to:
access a second smart device communicatively coupled to the router by performing at least one of obtaining web access to the second smart device, accessing the second smart device through a file transfer by a network address of the second smart device in the data network; accessing the second smart device through a remote administration protocol, and accessing the second smart device by a secure shell protocol.

13. The system of claim 8, wherein the processor is further configured to transmit the broadcast request through the data network by transmitting the broadcast request to the router that redirects the request to a plurality of smart devices communicatively coupled to the data network via the router.

14. The system of claim 8, wherein the processor is further configured to access the at least one smart device to obtain the settings of the at least one smart device by using a UPnP (Universal Plug-and-Play) protocol to obtain the settings.

15. A non-transitory computer readable medium storing computer executable instructions for eliminating vulnerabilities of smart devices connected to a data network, including instructions for:
identifying a router configured to provide access to the data network;
obtaining access to the network by connecting to the router;
transmitting a broadcast request through the data network to obtain access to at least one smart device communicatively coupled to the router;
accessing the at least one smart device communicatively coupled to the router;
obtaining settings of the at least one smart device by accessing a configuration file stored on the at least one smart device and containing settings of the smart device, wherein the settings of the at least one smart device includes one or both of a parameter or an attribute of the at least one smart device;
comparing, in a database, each of the settings of the at least one smart device with settings of known vulnerabilities to identify at least one network vulnerability of the settings of the at least one smart device that can be exploited by the processor by identifying a setting with a similar vulnerable status in the database;
determining an action for repairing the at least one network vulnerability associated with the at least one setting of the at least one smart device based on comparing of the each of the settings with the settings of known vulnerabilities in the database to identify the setting with the similar vulnerable status in the database; and transmitting instructions to the at least one smart device to perform the action for repairing the at least one network vulnerability associated with the at least one setting of the at least one smart device, wherein the action comprises adjusting the setting of the smart device by making changes in the configuration file itself.

16. The non-transitory computer readable medium of claim 15, further including instructions for:
accessing a web interface of the at least one smart device by obtaining a web page and parsing HyperText Markup Language (HTML) elements of the web page based on a document object model, wherein the web page contains the settings of the smart device; and
using the web interface of the at least one smart device to obtain the settings of the at least one smart device.

17. The non-transitory computer readable medium of claim 15, wherein the instructions for transmitting instructions to the at least one smart device for repairing the at least one network vulnerability further comprises instructions for:
changing a Boolean value in a line of the configurations file corresponding to the at least one network vulnerability associated with the at least one setting of the at least one smart device by changing the file.

18. The non-transitory computer readable medium of claim 16, further including instructions for transmitting instructions to the at least one smart device for repairing the at least one network vulnerability by adjusting the setting through the web interface of the at least one smart device, comprising instructions for:
modifying the web page using the document object model to select an HTML, control element corresponding to at least one setting of the smart device.

19. The non-transitory computer readable medium of claim 15, further comprising instructions for:
accessing a second device comprises at least one of obtaining web access to the second smart device, accessing the second smart device through a universal plug and play protocol, accessing the second smart device through a file transfer by a network address of the second smart device in the data network;
accessing the second smart device through a remote administration protocol, and
accessing the second smart device by a secure shell protocol.

20. The non-transitory computer readable medium of claim 15, wherein the instructions for transmitting of the broadcast request through the data network comprises instructions for transmitting the broadcast request to the router that redirects the request to a plurality of smart devices communicatively coupled to the data network via the router.

* * * * *